United States Patent [19]

Miyata et al.

[11] Patent Number: 4,516,172
[45] Date of Patent: May 7, 1985

[54] SOLID STATE TELEVISION CAMERA WITH IRIS CONTROL

[75] Inventors: Katsuro Miyata, Yokohama; Takashi Asaida; Fumio Nagumo, both of Atsugi, all of Japan

[73] Assignee: Sony Corporation, Tokyo, Japan

[21] Appl. No.: 405,571

[22] Filed: Aug. 5, 1982

[30] Foreign Application Priority Data

Aug. 10, 1981 [JP] Japan ................................. 56-125062

[51] Int. Cl.³ ............................................. H04N 5/16
[52] U.S. Cl. .................................. 358/228; 358/213; 358/221
[58] Field of Search ................. 358/228, 227, 50, 211, 358/209, 221, 213

[56] References Cited

U.S. PATENT DOCUMENTS

| | | | |
|---|---|---|---|
| 4,327,378 | 4/1982 | Tanaka et al. | 358/228 |
| 4,396,951 | 8/1983 | Tanaka | 358/228 |
| 4,399,466 | 8/1983 | Stephenson | 358/228 |

FOREIGN PATENT DOCUMENTS

| | | | |
|---|---|---|---|
| 52-55429 | 5/1977 | Japan | 358/50 |
| 126425 | 10/1979 | Japan | 358/228 |

Primary Examiner—Forester W. Isen
Assistant Examiner—Robert G. Lev
Attorney, Agent, or Firm—Hill, Van Santen, Steadman & Simpson

[57] ABSTRACT

A solid state television camera having a solid state image sensing device, such as CCD image sensing device and an iris for controlling the amount of light from an image irradiated on the image sensing device. The iris is controlled by the peak level of a smear signal of a horizontal scanning line during a vertical blanking interval so that the smear signal contained in a video signal from the image sensing device is reduced. Further, the iris can be controlled by the average level of the smear signal instead of the average level of the video signal of one field as the smear signal has the whole information of the image of one field, that causes the construction of detecting circuit to be very simple and the fidelity of the iris control to be high.

7 Claims, 6 Drawing Figures

SOLID STATE TELEVISION CAMERA WITH IRIS CONTROL

BACKGROUND OF THE INVENTION

1. Field of Invention

This invention relates to a television camera using a solid state image sensor such as a CCD (charge Coupled Device), and particularly is directed to an iris control system for a solid state television camera.

2. Description of the Prior Art

Recently, solid state imaging devices have been developed in many laboratories due to the advancement of semiconductor technology. Among various types of solid state image sensors, a CCD imager is of particular interest.

There are two types of CCD imagers which depend on the arrangement of CCD. One is the so called frame-transfer type and the other is the interline-transfer type. The former type of CCD imager has a image sensing array having a plurality of individual light sensing units arranged in both horizontal and vertical rows, and temporary storage devices of the same number as that of the light sensing units for storing and transferring the charges accumulated in said light sensing units, and a shift register for receiving the charges sequentially from the storage devices and generating a signal representing the image. In this type of CCD imager, as the light sensing units are irradiated by the light of the image during the transfer period of the charge from the image sensing array to the temporary storage area, an undesirable charge is mixed with the transferred charge representing the image. Because of the undesirable charge, the output signal of the CCD imager includes, a so called smear signal which may be one of the causes that the black portion of the image is whitish, particularly when the image has high contrast, such as in outside filming. The interline-transfer type CCD imager also generates a smear signal although the cause of generation is different from that of the frame transfer type CCD imager due to the difference of the arrangement of CCD. The appearance of smear is inevitable in the solid state imaging devices, and it causes deterioration of the generated signal.

Generally, a television camera has on iris means in an optical system arranged in front of the light sensing device for controlling the amount of light irradiated to the light sensing device so that the output signal has the proper level. Recently, many television cameras have adopted an automatic iris control for controlling the operation of the iris means by the average level of the output signal of the light sensing device. According to said existing iris control system, if the image picked up by the television camera has a small bright spot in the dark back-ground, the average level of the output signal is regarded to be relatively small, therefore the iris means is controlled so that more light will be irradiated on the light sensing device. This causes said bright spot to be more brilliant, and then the undesirable smear signal due to the bright spot becomes larger and the reproduced image from the picked up signal becomes noisy. Further, the averaging circuit requires very complicated circuit construction, because the picked up signal is a digital signal and the field or frame memory is required for averaging the whole signal during one field or frame. Finally, a solid state light sensing device, such as a CCD imager has a limitation for the capacity for handling or transferring the charge, so a charge above the predetermined level is thrown away to, for example, an over-flow-drain constructed in a CCD chip. In other words, the output signal from the CCD imager is clipped to a predetermined over-flow-level if the light from the image becomes very bright. Therefore, the picked up signal does not always represent the exact amount of light and the iris control using an average signal may not represent the average light amount from the image and results in a lack of fidelity of control. Since the smear signal is generated proportional to the radiated light, the prior art iris control does not reduce the level of the smear signal.

SUMMARY OF THE INVENTION

Accordingly, an object of the present invention is to provide a solid state television camera free from the defect of the prior art.

Another object of the invention is to provide a solid state television camera with an improved iris control system which can reduce the smear signal.

A further object of the invention is to provide a solid state television camera in which the control circuit of the iris means is very simple in construction.

Still further object of the invention is to provide a solid state television camera in which the iris control operation can be performed with high fidelity.

According to an aspect of the invention, there is provided an improved iris control system for use in a solid state television camera which generates the smear signal inevitably. The smear signal is detected from the output of the solid state imager, and the peak level of the detected smear signal controls the operation of the iris means so that the level of the smear signal is reduced. Since the smear signal is considered to represent the integrated signal of the image vertically in the image sensing device, the iris control for the average level of smear signal can be substituted for the existing control of the average level of the whole signal during a field or frame period.

Other objects and features of the invention will be apparent from the following description taken in connection with the accompanying drawings.

DESCRIPTION OF THE PREFERRED EMBODIMENTS

Figure 1:
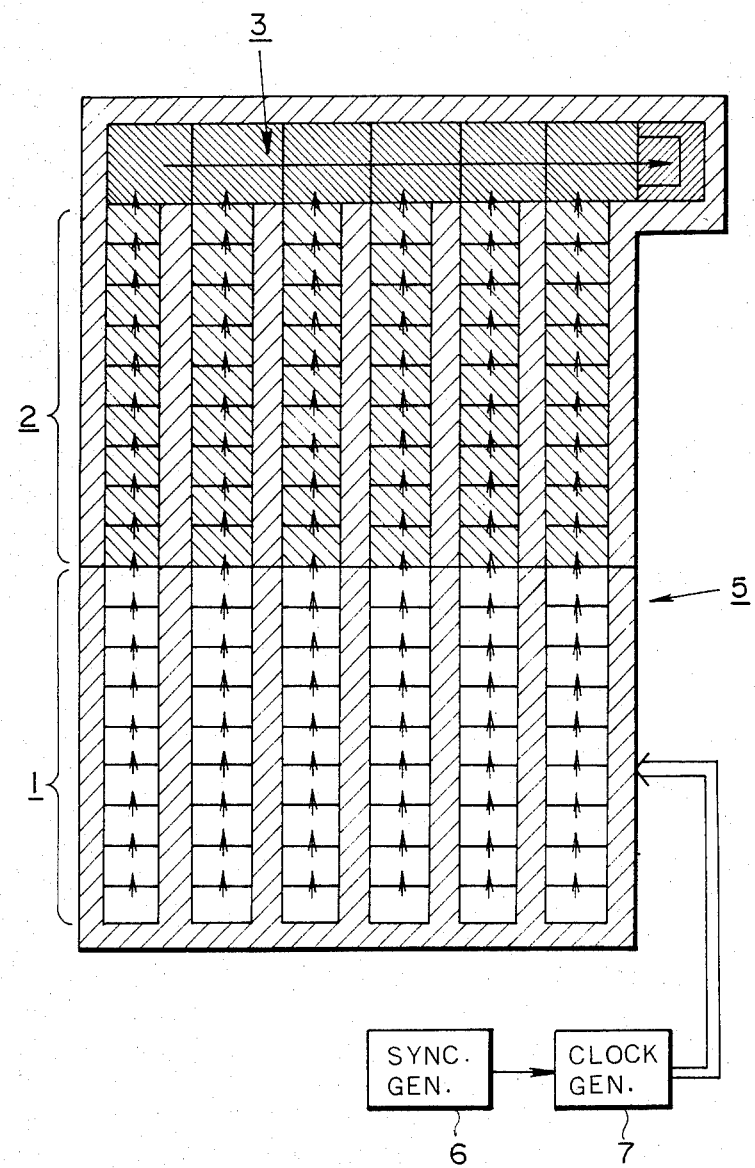
FIG. 1 is front view of a CCD imager of the frame transfer type usable in the invention.
Figure 2:
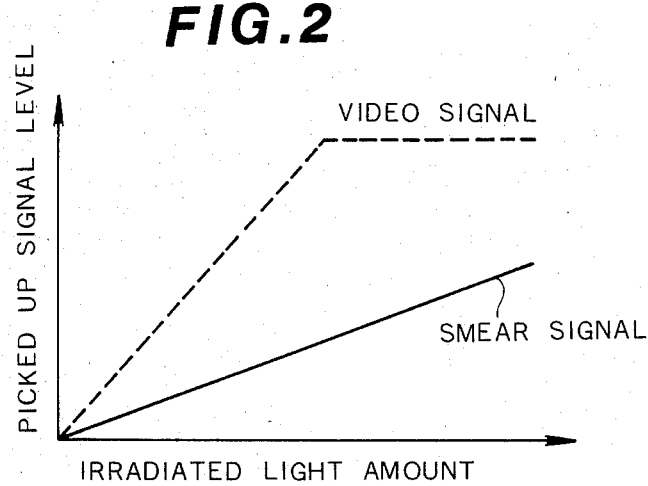
FIG. 2 is a schematic diagram showing the characteristics of the pick up video signal and smear signal responsive to the input light amount radiated on the solid state imager.

Referring first to FIG. 1 which shows a CCD imager of the frame tramsfer type usable in the present invention. The CCD imager 5 shown in FIG. 1 has an image sensing device 1 including a plurality of individual light sensing units arranged in both horizontal and vertical rows, a temporary storage devices 2 and a horizontal shift register 3 for generating a video signal sequentially. Further, a synchronizing signal generator 6 for generating a horizontal synchronizing signal and a vertical synchronizing signal are furnished to a clock signal generator 7 which generates various kinds of clock signals for controlling the operation of the image sensing device 1, the temporary storage devices 2 and the horizontal shift register 3. The signal charge generated in the image sensing device 1 is transferred vertically to the temporary storage devices 2, and the signal charge from the temporary storage devices 2 in read out line by line through the holizontal shift register 3. In this operation, during the transfer of the signal charge from, the image sensing device 1 to the temporary storage devices 2, the light from the image is still irradiated on the image sensing device 1, so that undesirable charges due to the irradiated light during the transfer period are generated and this causes a smear signal to be contained in the read out video signal. The CCD imager shown in FIG. 1 has the limitation of capacity for handling or transferring the charge, so the charge above the predetermined level is thrown away into an over-flow-drain (not shown) constructed in the CCD chip. Therefore the output video signal generated in the CCD imager 5 is clipped to an over-flow level even if the light of the image increases above the predetermined amount as shown in broken line in FIG. 2. On the contrary, the level of the smear signal increases proportional to the amount of the light irradiated on the image sensing device 1 as shown in the solid line of FIG. 2. Therefore, according to the existing iris control system for controlling the iris with the average level of the video signal obtained from the CCD imager, the smear signal contained in the video signal is not reduced and iris control having high fidelity can not be achieved.

Figure 3:
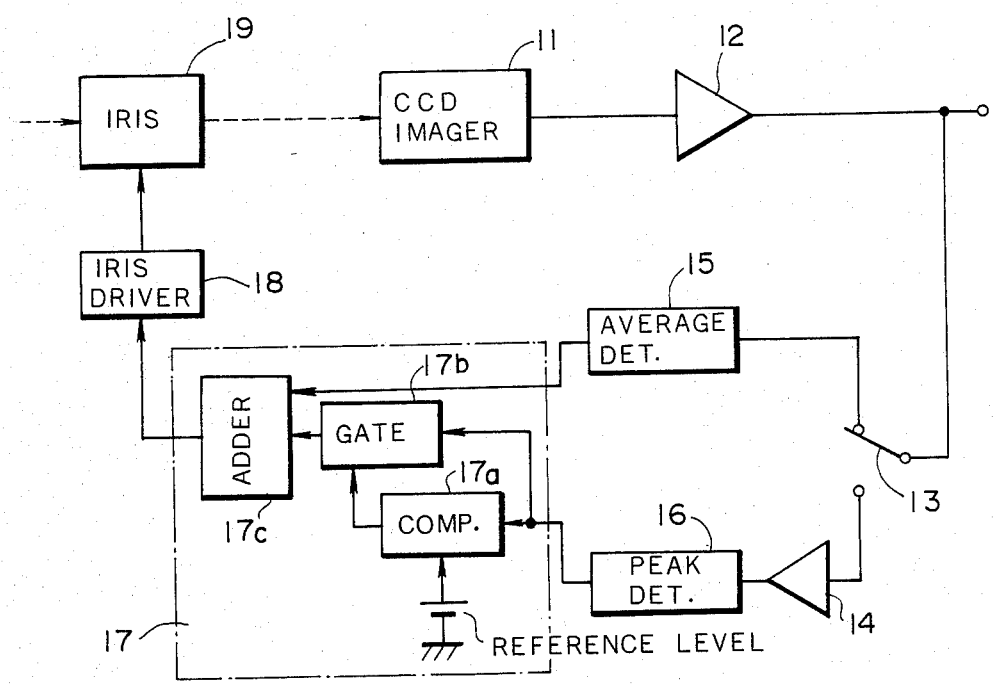
FIG. 3 is a block diagram showing an embodiment of an iris control system according to the invention.
Figure 4:
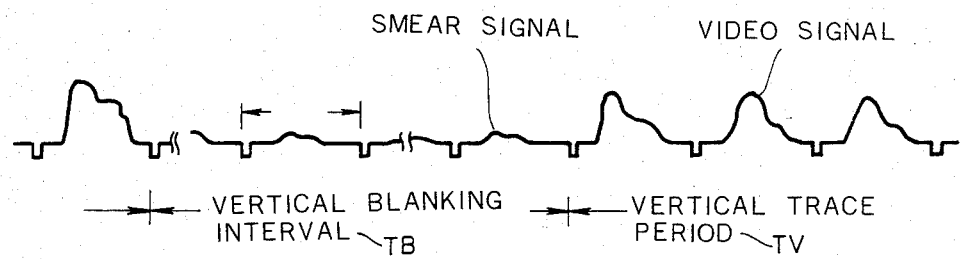
FIG. 4 is a waveform showing an output signal generated in a solid state imager.

In FIG. 3 which shows an embodiment of this invention, the output video signal from a CCD imager 11 is supplied to a movable contact of a of selecting switch 13 through a buffer amplifier 12. A first fixed tap of the switch 13 is connected to an average detector 15 and a second fixed tap of the switch 13 is connected to a peak detector 16. The selecting switch 13 is controlled by a control signal from the synchronizing signal generator 6 of FIG. 1. The movable tap of the switch 13 is connected to the first fixed tap during the vertical trace period $T_V$ shown in FIG. 4 and the video signal during that period is supplied to the average detector 15, and the movable tap of the switch 13 is connected to the second fixed tap during the vertical blanking interval $T_B$ shown in FIG. 4. The output signal from the CCD imager during the vertical blanking interval $T_B$ does not contain the signal representing the image theoretically, accordingly that signal can be considered as the smear signal. The smear signal during the vertical blanking interval $T_B$ is supplied to the peak detector 16 through an amplifier 14 which is used because the level of the smear signal is low compared with that of the video signal during the vertical trace period $T_V$ and the smear signal must be amplified to a comparable level of the video signal.

The detected outputs of the detectors 15 and 16 are supplied to a mixer 17 for generating a control signal of an iris driver 18 for an iris 19 disposed in front of the CCD imager 11. The mixer includes a comparator 17a for comparing the output of the peak detector 16 with a reference level which forms a threshold level, a gate circuit 17b which is controlled by the output of the comparator 17a and passes the output of the detector 16 when the level of the peak detected output is higher than the threshold, and an adder 17c for adding the outputs of the average detector 15 and the gate circuit 17b at an appropriate ratio. Therefore the iris 19 is controlled by only the average level of the video signal when the level of the smear signal is relatively small and the smear signal does not disturb the video signal representing the image. But when the level of the smear signal is higher than the threshold level and the smear signal causes a bad influence on the video signal, the iris 19 is controlled by the synthesized outputs of both the average detector 15 and the peak detector 16.

Here, the smear signal of one horizontal period in the vertical blanking interval $T_B$ is proportional to the integrated signal of the video signal representing the whole image vertically in the CCD imager and the signals of each horizontal period in the vertical blanking interval $T_B$ are quite similar to each other, so the smear signal for any one horizontal period can be regarded to have all the information of the light during one field. Therefore the peak detector 16 can be designed to detect the peak level of the signal for only one horizontal period in the vertical blanking interval $T_B$. According to the embodiment of FIG. 3 and explained above, the iris control for reducing the level of the smear signal when it is unusually large can be realized because both the average level of the video signal and the peak level of the smear signal are used as the control signal of iris 19.

Figure 5:
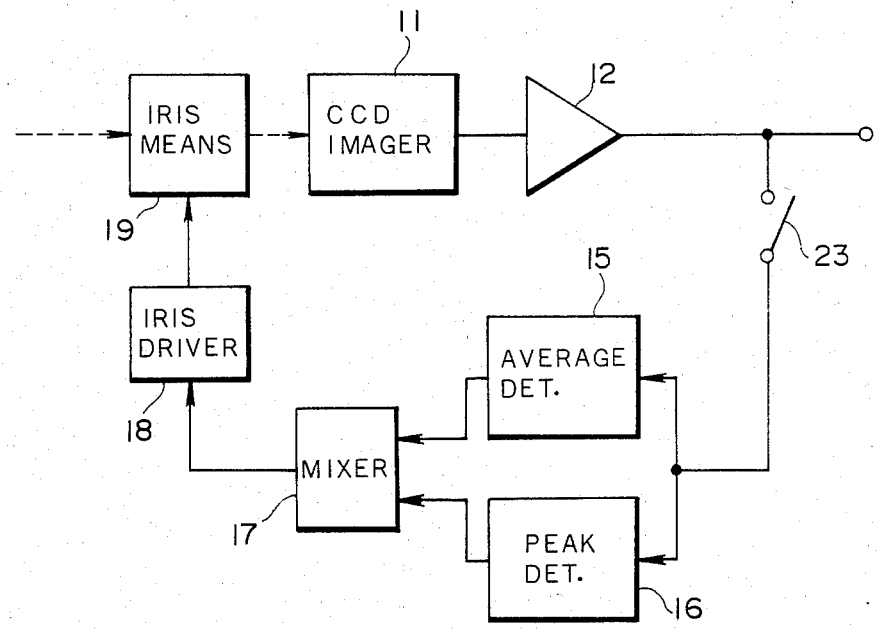
FIG. 5 is a block diagram showing another embodiment of an iris control system according to the invention.

FIG. 5 shows a second embodiment of the invention wherein only the smear signal is supplied to both peak and average detectors in parallel and the control signal for iris 19 is generated from only the smear signal while both the smear signal and video signal are used for generating a control signal for the iris in the embodiment of FIG. 3. In FIG. 5, the output signal of the buffer amplifier 12 is supplied to a smear signal gating switch 23 which is turned on during one horizontal period of the vertical blanking interval $T_B$, and the smear signal during this period is gated and supplied to both the average detector 15 and the peak detector 16. The outputs of these detectors are mixed by the mixer 17 which can be constructed the same as in FIG. 3, and the output of the mixer 17 controls the iris driver 18 for the iris 19. In this embodiment, since the smear signal during one horizontal period of the vertical blanking interval has the all information of the light of the image during one field period as explained above, the same effect as in the embodiment of FIG. 3 wherein the video signal of one entire period is detected by the average detector can be achieved. Particularly when the output signal from the CCD imager is a digital video signal, the average detector 15 can have a very simple construction in this embodiment, while in the embodiment of FIG. 3 or in the existing iris control system, a field memory for memorizing the digital video information of one field is required to obtain the average level of the video signal during one field.

Figure 6:
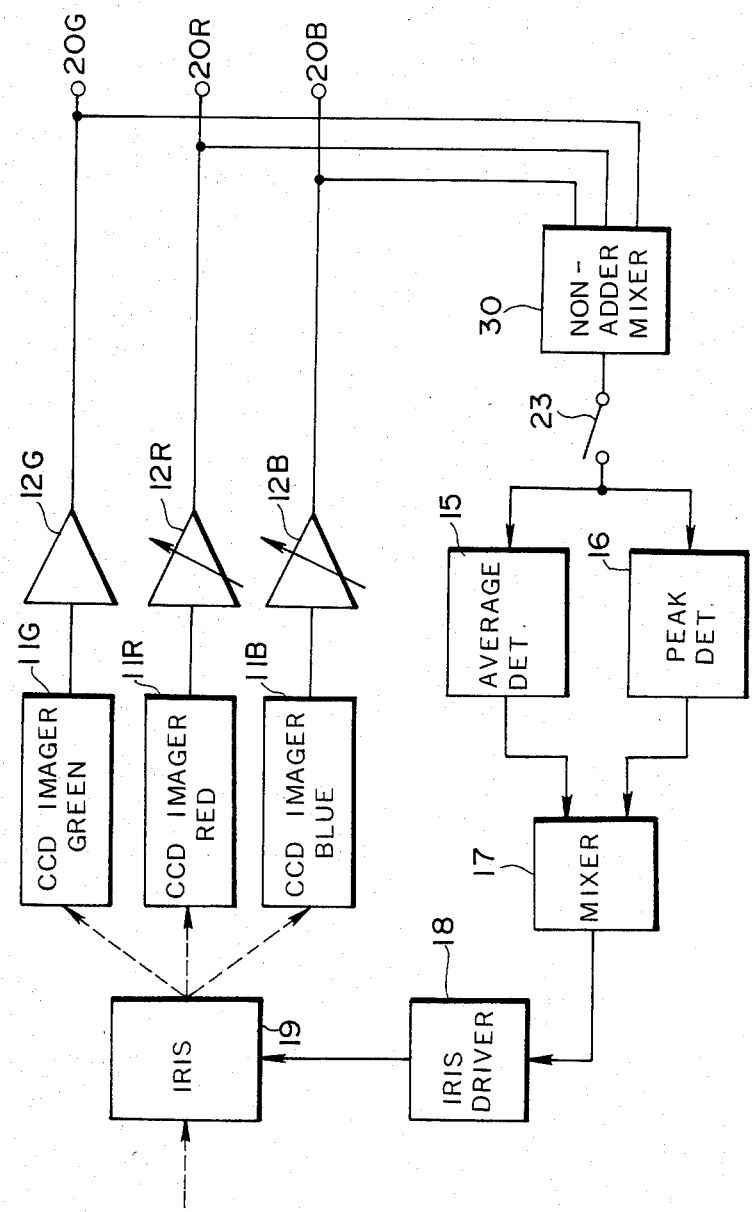
FIG. 6 is a block diagram showing an embodiment of an iris control system used in a solid state color television camera with three CCD chips.

The third embodiment in which the present invention is applied to a solid state color television camera will be explained hereinafter with reference to FIG. 6. The solid state color television camera in FIG. 6 has three chips comprising solid state image sensors 11G for green, 11R for red and 11B for blue. Three primary color signals obtained from image sensors 11G, 11R and 11B are fed to output terminals 20G, 20R and through amplifiers 12G 12R and 12B for adjustment of the white balance. The iris 19 common to the three solid state image sensors 11G 11R and 11B for adjusting the amount of light irradiated on each image sensor is controlled by the level of the smear signal of one horizontal period in the vertical blanking interval $T_B$. That is, the output signals of the amplifiers 12G, 12R and 12B are supplied to a non-adder mixer 30 which generates an output signal equal to the highest level of the input signals or operates as a signal selector for selecting a signal with the highest level. The smear signal of one horizontal period in the vertical blanking interval $T_B$ contained in the output of the non-adder mixer 30 is gated by a gating switch 23 and is supplied to the detectors 15 and 16. The average level and the peak level of the smear signal detected by detectors 15 and 16 are supplied to the mixer 17, and the output of the mixer 17 is supplied to the iris driver 18 for the iris 19 as a control signal. The mixer 17 may be constructed as shown in FIG. 3.

As explained above with reference to various embodiments, the deterioration in the picture quality can be reduced and the iris control with the higher fidelity can be attained with a simple circuit construction for controlling the iris and the level of the signal is controlled by the smear signal in the vertical blanking interval obtained from the solid state image sensor.

It will be apparent that many modifications and variations may be effected without departing from the scope of the novel concepts of this invention.

What is claimed is:

1. A solid state television camera having a solid state image sensing device including a plurality of individual light sensing units arranged in both horizontal and vertical rows and for sequentially generating an output signal corresponding to an image by transferring a charge generated by said light sensing units, said solid state television camera comprising,
   (A) a synchronizing signal generator for generating horizontal and vertical synchronizing signals,
   (B) a clock pulse generator controlled by said synchronizing signals and for generating various kinds of clock pulses controlling the transfer of the charge generated in said light sensing units,
   (C) iris means for controlling the light amount from the image radiated on said light sensing units,
   (D) driver means for controlling said iris means,
   (E) smear signal detecting means for producing a smear output signal from the output signal of said solid state image sensing device, and
   (F) means for supplying said smear output signal to said drive means such that the light amount is controlled by the level of said smear signal.

2. A solid state television camera according to claim 1, wherein said smear signal detecting means includes a detecting circuit for detecting a signal during a horizontal period in a vertical blanking period.

3. A solid state television camera according to claim 1, wherein said means for supplying includes a peak detector for detecting the peak level of said smear output signal.

4. A solid state television camera according to claim 3, wherein said means for supplying further includes an average detector for detecting an average level of said output signal of said solid state image sensing device and a mixer for mixing the outputs of said peak detector and said average detector.

5. A solid state television camera according to claim 4, wherein said mixer generates an output responsive to the output of said average detector when the output of said peak detector is less than a threshold level and said mixer generates an output responsive to both the outputs of said average and said peak detectors when the output of said peak detector is above said threshold level.

6. A solid state television camera according to claim 3, wherein said means for supplying further includes an average detector for detecting an average level of said smear signal and a mixer for mixing the outputs of said peak and average detectors.

7. A solid state television camera according to claim 1, wherein said television camera comprises three solid state image sensing devices for the three primary colors for generating three output signals representing each color component of the image, respectively, said iris means is common to said three solid state image sensing devices, and said smear signal detecting means includes a non-adder mixer for generating an output equal to the maximum level of three smear signals of said three output signals.

* * * * *